United States Patent [19]

Weiner

[11] 4,102,042
[45] Jul. 25, 1978

[54] METHOD FOR PREPARING A SODIUM/SULFUR CELL

[75] Inventor: Steven A. Weiner, Farmington Hills, Mich.

[73] Assignee: Ford Motor Company, Dearborn, Mich.

[21] Appl. No.: 777,284

[22] Filed: Mar. 11, 1977

[51] Int. Cl.² .......................................... H01M 6/30
[52] U.S. Cl. .................................. 29/623.2; 429/191
[58] Field of Search .......................... 29/623.1, 623.2; 429/165, 172, 191

[56] References Cited

U.S. PATENT DOCUMENTS

| | | | |
|---|---|---|---|
| 3,471,330 | 10/1969 | Berger et al. ........................ | 429/191 |
| 3,765,945 | 10/1973 | Sudworth ............................ | 429/191 |
| 3,939,007 | 2/1976 | Sudworth ............................ | 429/172 |
| 4,037,027 | 7/1977 | Desplanches et al. ............... | 429/191 |

Primary Examiner—Lowell A. Larson
Attorney, Agent, or Firm—Roger L. May; Keith L. Zerschling

[57] ABSTRACT

A method for preparing a sodium/sulfur cell comprising (A) inserting a solid sodium slug, adapted to be connected to an external circuit, into the anodic reaction zone of a cell subassembly maintained within an inert atmosphere, said cell subassembly comprising a cell container and a tubular cation-permeable barrier disposed within said container such that a first reaction zone is located within cation-permeable barrier and a second reaction zone is located between the outer surface of said cation-permeable barrier and the inner surface of said container, one of said reaction zones being said anodic reaction zone and the other of said reaction zone being a cathodic reaction zone containing a precast composite cathodic reactant comprising a sulfur impregnated porous conductive material connected to said cation permeable barrier and adapted to be connected to said external circuit; and (B) providing closure means for said subassembly and sealing the same to said subassembly at a temperature less than about 100° C. The method of the invention overcomes deficiencies of the prior art methods by allowing preparation of a sodium/sulfur cell without the use of molten reactants and the fill spouts which are required when the cell is filled with molten reactants.

7 Claims, 1 Drawing Figure

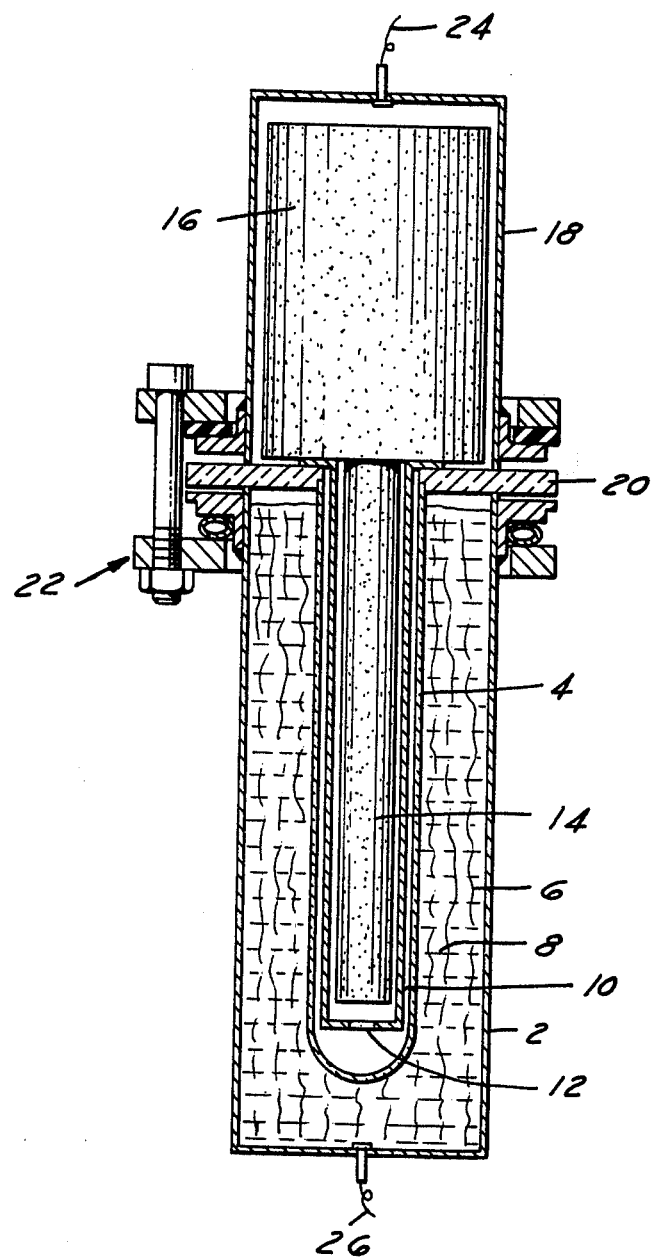

METHOD FOR PREPARING A SODIUM/SULFUR CELL

The Subject Invention described herein was made in the course of or under a contract with the U.S. Energy Research and Development Administration.

The invention herein described relates to an improved method for the preparation of a sodium/sulfur cell.

More particularly, this invention relates to an improved method of preparing a sodium/sulfur cell wherein the anodic and cathodic reactants are introduced as solids rather than in the molten state, thus avoiding the necessity of using awkward and fragile fill spouts.

BACKGROUND OF THE INVENTION

A recently developed type of secondary cell comprises: (1) a cell container; (2) a cation-permeable barrier to mass liquid transfer in the form of a solid electrolyte tube disposed within said container such that a first reaction zone is located within said cation-permeable barrier and a second reaction zone is located between the outer surface of said cation-permeable barrier and the inner surface of said container, one of said reaction zones being an anodic reaction zone and the other said reaction zone being a cathodic reaction zone; (3) an anodic reactant within said anodic reaction zone comprising a molten alkali metal anode-reactant such as sodium in electrical contact with an external circuit; (4) a cathodic reactant disposed within said cathodic reaction zone and comprising a liquid electrolyte such as sulfur and molten polysulfides, which is electrochemically reversibly reactive with said alkali metal; and (5) a cathodic electrode comprising a porous conductive material disposed within said cathodic reaction zone, connected to said cation-permeable barrier and adapted to be connected to said external circuit.

As used herein, the term "reactant" is intended to mean both reactants and reaction products.

In the method which has been conventionally used to prepare such cells, the anodic reactant, or sodium, and the initial cathodic reactant, or sulfur, have been added to the two reaction zones of the cell while in a molten state. Normally, the molten sulfur is added to the cathodic reaction zone through a fill spout which is pinched off and sealed after filling the cathodic reaction zone. Thereafter, the assembled cell subassembly is evacuated and melted sodium is flowed into the cell through a fill spout, which also is subsequently sealed off. If the cell is not to be employed immediately, the prepared cell is next "frozen" so as to solidify the reactants. Both this method and the resultant cell suffer from some rather serious disadvantages. First, the method is undesirably dangerous because of the use of molten reactants, thus exposing those preparing the cells to undue danger. Secondly, the preparation of the cell in this manner is unduly complicated and requires an impractical amount of equipment. For example, the evacuation of the cell, the melting of the two reactants, the feeding of the reactants through fill spouts and the subsequent pinching off and sealing of the reactants are time consuming and uneconomical steps, particularly if the cells in question are to be mass produced. Also, the fill spouts, which are required when the reactants are to be added in a molten state, present some additional difficulties in the preparation of arrays of such cells. Because the fill spouts, even after being pinched off and sealed protrude from the cell body itself, they interfere with the stacking of the cells in the preparation of batteries. They also provide an inherent weakness in the cells inasmuch as damage to the fill spout will result in leakage and/or contamination of the individual cells.

It has been suggested to employ a precast composite of sulfur a porous conductive electrode rather than filling the cathodic reaction zone with molten sulfur during actual cell preparation. However, even when such a precast sulfur electrode is employed, the prior art method for the preparation of sodium/sulfur cells suffers from many of the aforementioned deficiencies. This is the case since prior art techniques still call for the use of a vacuum to evacuate the cell subassembly and the addition of sodium to the cell in a molten form through a fill tube which is subsequently pinched off and sealed.

It is an object of this invention to provide a method for the preparation of a sodium/sulfur cell wherein the reactants, i.e., sodium and sulfur, need not be added to the cell subassembly in a molten state and wherein the cell does not require the use of fill tubes which must be pinched off and sealed.

BRIEF DESCRIPTION OF THE INVENTION

This object and more detailed objects, which will be apparent to those skilled in the art, are accomplished by the improved method of this invention which comprises:

(A) inserting a solid sodium slug, adapted to be connected to an external circuit, into the anodic reaction zone of a cell substantially maintained within an inert atmosphere, said cell subassembly comprising a cell container and a tubular cation-permeable barrier disposed within said container such that a first reaction zone is located within said cation-permeable barrier and a second reaction zone is located between the outer surface of said cation-barrier and the inner surface of said container, one of said reaction zones being said anodic reaction zone and the other of said reaction zones being a cathodic reaction zone containing a precast composite cathodic reactant comprising a sulfur inpregnated porous conductive material connected to said cation-permeable barrier and adapted to be connected to said external surface circuit; and (B) providing closure means for said subassembly at a temperature less than about 100° C.

The invention will be more fully understood after reading the following detailed description thereof in conjuction with the drawing which shows a cell prepared in accordance with the method of the invention.

DETAILED DESCRIPTION OF THE INVENTION

The secondary or rechargeable sodium/sulfur cell which may be prepared in accordance with the improved method of this invention and the various components thereof are well known to those skilled in the art and are disclosed in a number of United States patents including the following: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; 3,811,493; 3,951,689; 3,966,492; 3,976,503; 3,980,496; 3,985,575; 3,985,576; 3,992,503; 3,994,745; 4,002,806; and 4,002,807.

As mentioned above, the type of secondary battery or cell to which the improvement of this invention applies generally comprises: (1) an anodic reaction zone containing a molten alkali metal-anode in electrical contact with an external circuit; (2) a cathodic reaction zone containing (i) a cathodic reactant comprising a liquid electrolyte selected from sulfur or a mixture of sulfur and sulfur saturated polysulfide salts of said molten alkali metal reactant which are electrochemically reversibly reactive with said anodic reactant and (ii) a porous electrode; and (3) a cation-permeable barrier to mass liquid transfer interposed between and in contact with said anodic and cathodic reaction zones.

The anodic reactant employed in such a device is an alkali metal which is maintained above its melting point when the device is in operation. The anodic reactant is heated by any conventional means including, but not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor it is also undergoing an electrochemical reaction. Molten sodium is typically employed as the anodic reactant in the most preferred embodiments of such devices.

The cathodic reactant is a molten material, e.g. molten sulfur, which is electrochemically reversibly reactive with the anodic reactant. As the device begins to discharge, the mole fraction of elemental sulfur drops while the open cell voltage remains constant. During this portion of the discharge cycle, as the mole fraction of sulfur drops from 1.0 to approximately 0.72 the cathodic reactant displays two phases, one being essentially pure sulfur and the other being sulfur saturated alkali metal polysulfide in which the mole ratio of sulfur to alkali metal is about 5.2:2 When the device is discharged to the point where the mole fraction of sulfur is about 0.72, the cathodic reactant becomes one phase in nature since all elemental sulfur has formed polysulfide salts. As the device is discharged further, the cathodic reactant remains one phase in nature and as the mole fraction of sulfur drops, so does the open circuit voltage corresponding to the change in the potential determining reaction. Thus, the device continues to discharge from a point where polysulfide salts contain sulfur and alkali metal in a mole ratio of approximately 5.2:2 to the point where polysulfide salts contain sulfur and alkali metal in a ratio of about 3:2. At this point the device is fully discharged.

The cell subassembly which is employed in the method of cell preparation of this invention comprises a container, which may be formed of any material which is not subject to corrosion by the reactant which will be in contact therewith, e.g., stainless steel, and a tubular cation-permeable barrier which is disposed internally thereof so as to create a first reaction zone within the cation-permeable barrier and a second reaction zone between the outer surface of the cation-permeable barrier and the inner surface of the container. The anodic reactant is contained in one of the reaction zones which is the anodic reaction zone and the cathodic reactant is contained within the other reaction zone or cathodic reaction zone.

The anodic reactant is thus separated from the cathodic reactant by the cation-permeable barrier which is a solid barrier to mass liquid transfer and which is selectively ionically conductive with respect to cations of the sodium reactant and substantially impereable to the other ions which may be stored in the cathodic reactant. Thus, the reaction zone separator or solid electrolyte is a material which will permit the transfer of the ions of the anodic reactant through the separator and into the cathodic reactant during operation of the device. The cathodic reactnat together with the separator provides a sufficient barrier to free electron flow in the internal portion of the electrical circuit to permit a difference of potential to develop at the respective electrodes of the device in operation. It is preferred that the separator be as thin as possible without unduly sacrificing strength. Although optimum thickness may vary with intended use, separators having a thickness in the range of about 20 to about 200, preferably 100 to about 1000 microns have been found to be very effective.

Both glass and polycrystalline ceramic materials have been found suitable for use in such devices as the cation-permeable barrier or reaction zone separator. The various glasses which are suitable as cation-permeable barriers are described in many of the aforementioned patents. The glasses disclosed therein may be prepared by conventional glass making procedures using the ingredients described therein and firing at temperatures of about 2700° F.

The polycrystalline ceramic materials useful as cation-permeable barriers are bi- or multi-metal oxides. Such materials are described in a number of the aforementioned patents. Among the most preferred of these materials are those in the family of beta-type alumina, all of which exhibit a generic crystalline structure which is readily indentifiable by x-ray diffraction. Thus, beta-type alumina or sodium beta-type alumina is a material which may be thought of as a series of layers of aluminum oxide held apart by columns of linear Al—O bond chains with sodium ions occupying sites between the layers and columns. Among the numerous useful polycrystalline beta-type-alumina materials are: (1) standard beta-type alumina; (2) boron oxide ($B_2O_3$) modified beta-type alumina; (3) substituted beta-type-alumina; and (4) beta-type alumina which is modified by the addition of a minor proportion by weight of metal ions having a valence not greater than 2. In preferred cell designs wherein the container is cylindrical and the first reaction zone within the cation permeable barrier is the anodic reaction zone while the second reaction zone is the cathodic reaction zone, a preferred method taught by Minck for the preparation of the precast sulfur electrode comprises cutting a graphite felt to shape and compressing it in a direction normal to that which will contact the ceramic. The felt is outgassed at elevated temperature and while maintained by low pressure, liquid sulfur is poured in and allowed to freeze. In tubular cells, the electrode is often formed by a stack of "washers" of felt. These are inserted over a plastic (teflon or nylon) rod the diameter of which is suitably larger than the ceramic tube. Then the tube with washers is inserted into a pyrex tube the inner diameter of which is suitably smaller than the final size of the electrode. The unit is outgassed and filled with sulfur. After the sulfur solidifies and cools, differential contraction permit easy removal of the glass tube and plastic rod from the precast electrode.

As discussed above, the improvement of this invention, completely eliminates the use of molten reactants and fill spouts, by employing a solid sodium slug, rather than filling the anodic reaction zone of the cell with molten sodium. In accordance with the improved method of the invention the subassembly comprising the cell container and the tubular cation permeable barrier with the precast sulfur impregnated porous material filling the cathodic reaction zone, is maintained within an inert atmosphere (e.g. argon) while the slug of sodium is inserted into the anodic reaction zone. Subsequent to inertion of the sodium slug, the cell is provided with a closure means in the conventional fashion and the cell sealed at a temperature of below about 100° C. Such sealing is typically accomplished by a mechanical seal.

Since the amount of sodium contained within the anodic reaction zone of any given cell is not sufficient to operate the cell for the time periods required, such cells generally have an anodic reactant storage zone which is located above the anodic reaction zone so as to allow molten sodium during cell operation to flow from the storage zone into the anodic reaction zone. The preparation of such a cell may be accomplished by employing a sodium slug which comprises a vertical elongate portion which extends into the anodic reaction zone and a larger portion which is attached to the elongate portion and extends above the cell subassembly. In the preferred cell design wherein the first reaction zone or the reaction zone formed within the cation-permeable barrier forms the anodic reaction zone, the elongate portion of the sodium slug is essentially a elongate rod which extends into the cation-permeable barrier.

In a cell design wherein an enlarged sodium portion is disposed above the subassembly so as to provide a reservoir of the anodic reactant, a sodium container must be disposed around those sides of that larger portion of sodium which are not adjacent to the subassembly. The cell is then sealed to the subassembly such that the sodium container and the subassembly are sealed together with an insulating component disposed between the sodium in the sodium storage reservoir and the cathodic reaction zone of the subassembly. In the preferred embodiment, wherein the first reaction zone is the anodic reaction zone, the insulating component ideally comprises an alpha-alumina disc having an opening disposed centrally thereof such that during operation of the cell, molten sodium can flow from the sodium container into the anodic reaction zone.

A safety feature which may be incorporated into cells manufactured using the improvement of this invention, comprises a safety sleeve which is inserted into the anodic reaction zone prior to insertion of the sodium slug. This safety sleeve, which in the case wherein the first reaction zone is the anodic reaction, is a tubular member has holes therein such that the molten sodium can flow therethrough during cell operation and is positioned in the anodic reaction zone so as to provide a space between the sleeve and the wall of the anodic reaction zone so that the sodium may be exposed to the walls of the reaction zone. This feature protects against catastrophic failure in the event of breakage of the cation-permeable barrier by reducing the amount of sodium which will flow immediately into contact with the cathodic reactant of the cell.

A preferred cell design prepared in accordance with the improved method of this invention is shown in the figure. Cylindrical cell container 2 may be formed of any material which is resistant to the polysulfide salts of the cathodic reactants. In the design shown, the container also acts as a current collector and, therefore, must be a conductor, so as to conduct electricity to the cathodic contact 46. Tubular cation-permeable barrier 4, preferably beat-type alumina, is disposed interiorly of container 2. Thus, an anodic reaction zone is formed in the interior of the cation-permeable barrier 4 and a cathodic reaction zone is formed between the outer walls of cation-permeable barrier 4 and the inner wall of container 2. The cathodic reaction zone contains the precast sulfur electrode comprising a porous conductive felt material such as graphite felt 6 and sulfur 8.

Shown within cation-permeable barrier 4 is safety sleeve 10 formed of a material such as stainless steel which is resistant to molten sodium and having holes 12 in the end thereof such that molten sodium may flow therethrough and into the vicinity of cation-permeable barrier 4. Note that safety sleeve 10 is of smaller diameter than the inner diameter of cation-permeable barrier 4, thus leaving a space for the molten sodium to flow around the sleeve and into contact with the barrier. The sodium slug is shown disposed within the safety sleeve 10, with elongate portion 14 extending down into sleeve 10 and larger portion 16 disposed above the cell subassembly. Sodium container 18 is formed of a material suitably resistant to molten sodium, and is disposed around three sides of larger portion 16 of the sodium slug. The slug is adapted to be in contact with an external circuit through contact 24.

Sodium container 18 is shown sealed mechanically to the cell subassembly by sealing means generally shown at 22, with alpha-alumina disc 20 disposed between the subassembly and the sodium container with the larger portion of the sodium slug contained therein. Alpha alumina disc 20 separates the sodium slug from the cathodic reaction zone of the cell subassembly and has a hole centrally disposed thereof such that the elongate portion of the sodium slug passes therethrough and such that during cell operation, molten sodium may pass from the sodium container into the anodic reaction zone.

EXAMPLE

A sodium/sulfur cell is prepared in the following manner:

(1) cylindrical sodium and sulfur containers are prepared from stainless steel. The cylinders are of equal diameter, have one open end, and are adapted to be joined together at such open ends;
(2) a graphite felt electrode is joined to the sulfur container such as to leave a central opening;
(3) a teflon mandril (slight larger than the diameter of the $\beta''$-alumina electrolyte), is inserted into the central opening in the graphite felt electrode;
(4) molten sulfur is added to the desired level;
(5) the teflon mandril is removed and an alpha-beta sealed ceramic assembly is inserted in its place;
(6) a stainless steel safety sleeve having holes therein is positioned within the ceramic assembly;
(7) the entire subassembly is removed into an inert atmosphere (e.g., argon);
(8) a "T" shaped precut or precast sodium slug is inserted into the safety sleeve such that the upper portion or enlarged portion thereof extends above the subassembly;
(9) the cylindrical sodium container is placed over the top of the sodium slug with an alpha alumina disc having a hole centrally located therein interposed between the sodium and sulfur containers; and
(10) the sodium and sulfur containers are mechanically sealed together at a temperature below 100° C.

After the sealing operation, the cell is ready to be heated to operating temperature and thereby convert the solid sodium and sulfur reactants to their molten state.

In view of this disclosure, many modifications of this invention will be apparent to those skilled in the art. It is intended that all such modifications which fall within the scope of this invention be included within the terms of the appended claims.

I claim:

1. A method for preparing a sodium/sulfur cell comprising:
    A. inserting a solid sodium slug, adapted to be connected to an external circuit, into the anodic reaction zone of a cell subassembly maintained within an inert atmosphere, said cell subassembly comprising a cell container and a tubular cation-permeable barrier disposed interiorly thereof such that a first reaction zone is located within said cation-permeable barrier and a second reaction zone is located between the outer surface of said cation-permeable barrier and the inner surface of said container, one of said reaction zones being said anodic reaction zone and the other of said reaction zones being a cathodic reaction zone containing a precast composite cathodic reactant comprising a sulfur impregnated porous conductive material connected to said cation-permeable barrier and adapted to be connected to said external circuit; and
    B. providing closure means for said subassembly and sealing the same to said subassembly at a temperature less than about 100° C.

2. A method in accordance with claim 1 wherein said closure means is sealed to said subassembly by mechanical sealing means.

3. A method in accordance with claim 1 wherein (i) a solid safety sleeve having holes therein such that molten sodium can flow therethrough during cell operation is positioned in said anodic reaction zone so as to provide a space between said sleeve and the wall of said anodic reaction zone, and (ii) said sodium slug is disposed within said safety sleeve.

4. A method in accordance with claim 1 wherein (i) said sodium slug comprises a vertical elongate portion which extends into said anodic reaction zone and a larger portion attached to said elongate portion and extending above said subassembly; (ii) a sodium container is disposed around those sides of said larger portion which are not adjacent to said subassembly; and (iii) said sodium container is sealed to said subassembly with an insulating component disposed between said sodium and said cathodic reaction zone of said subassembly.

5. A method in accordance with claim 4 wherein said first reaction zone is said anodic reaction zone and said second reaction zone is said cathodic reaction zone.

6. A method in accordance with claim 4 wherein said insulating component comprises an alpha-alumina disc having an opening disposed centrally thereof such that during operation of said cell molten sodium can flow from said sodium container into said anodic reaction zone.

7. A method in accordance with claim 4 wherein (i) a solid safety sleeve having holes therein such that molten sodium can flow therethrough is positioned in said anodic reaction zone so as to provide a space between said sleeve and the walls of said anodic reaction zone, and (ii) said sodium slug is disposed therein.

* * * * *